(12) United States Patent
Nihei

(10) Patent No.: US 11,018,968 B2
(45) Date of Patent: May 25, 2021

(54) PACKET TRANSMISSION METHOD AND PACKET TRANSMITTING DEVICE

(71) Applicant: NEC Corporation, Tokyo (JP)

(72) Inventor: Koichi Nihei, Tokyo (JP)

(73) Assignee: NEC CORPORATION, Tokyo (JP)

( * ) Notice: Subject to any disclaimer, the term of this patent is extended or adjusted under 35 U.S.C. 154(b) by 420 days.

(21) Appl. No.: 15/571,902

(22) PCT Filed: May 17, 2016

(86) PCT No.: PCT/JP2016/002402
§ 371 (c)(1),
(2) Date: Nov. 6, 2017

(87) PCT Pub. No.: WO2016/185710
PCT Pub. Date: Nov. 24, 2016

(65) Prior Publication Data
US 2018/0139117 A1    May 17, 2018

(30) Foreign Application Priority Data

May 20, 2015 (JP) .............................. JP2015-102571

(51) Int. Cl.
*H04L 12/26* (2006.01)
*H04L 29/14* (2006.01)
*H04L 12/911* (2013.01)

(52) U.S. Cl.
CPC .......... *H04L 43/10* (2013.01); *H04L 43/0882* (2013.01); *H04L 47/822* (2013.01); *H04L 69/40* (2013.01)

(58) Field of Classification Search
CPC ..... H04L 43/10; H04L 69/40; H04L 43/0882; H04L 47/822
See application file for complete search history.

(56) References Cited

U.S. PATENT DOCUMENTS

| 6,393,583 B1* | 5/2002 | Meth ................... G06F 11/1438 |
| | | 714/12 |
| 2008/0062923 A1* | 3/2008 | Ponnuswamy ..... H04W 72/005 |
| | | 370/331 |

(Continued)

FOREIGN PATENT DOCUMENTS

| JP | 2005-252627 A | 9/2005 |
| JP | 2011-142622 A | 7/2011 |

(Continued)

OTHER PUBLICATIONS

International Search Report for PCT Application No. PCT/JP2016/002402, dated Jul. 26, 2016.

(Continued)

*Primary Examiner* — Hassan Kizou
*Assistant Examiner* — Abdullah Ahmed

(57) ABSTRACT

In order to efficiently transmit measurement packets to a plurality of receiving devices at a constant transmission interval, provided is a packet transmission method that comprises a procedure in which transmission requests for a packet sequence composed of a plurality of packets transmitted at a first time interval are grouped every first time interval, and the packet sequence is transmitted on the basis of a transmission request for a group for which the number of transmission requests is at least a specified value.

12 Claims, 18 Drawing Sheets

(56) References Cited

U.S. PATENT DOCUMENTS

| | | | | |
|---|---|---|---|---|
| 2008/0062948 A1* | 3/2008 | Ponnuswamy | H04W 52/02 | 370/342 |
| 2008/0095193 A1* | 4/2008 | Gaedke | H04L 47/10 | 370/473 |
| 2011/0044237 A1* | 2/2011 | Oh | H04B 7/2041 | 370/326 |
| 2011/0205962 A1* | 8/2011 | Das | H04W 74/00 | 370/328 |
| 2012/0183033 A1* | 7/2012 | Allpress | H04L 1/20 | 375/224 |
| 2012/0307661 A1 | 12/2012 | Oshiba | | |
| 2014/0119214 A1* | 5/2014 | Jeon | H04L 43/50 | 370/252 |
| 2014/0269251 A1* | 9/2014 | Zhou | H04W 24/04 | 370/216 |
| 2015/0016250 A1* | 1/2015 | Flinta | H04L 69/28 | 370/230 |
| 2015/0304942 A1* | 10/2015 | Wentink | H04B 17/318 | 370/312 |
| 2016/0165514 A1* | 6/2016 | Lou | H04W 4/06 | 370/328 |
| 2016/0254972 A1 | 9/2016 | Oshiba | | |

FOREIGN PATENT DOCUMENTS

| | | |
|---|---|---|
| WO | 2011/071127 A1 | 6/2011 |
| WO | 2015/064108 A1 | 5/2015 |

OTHER PUBLICATIONS

English translation of Written opinion for PCT Application No. PCT/JP2016/002402.

\* cited by examiner

FIG. 7

| ID | TRANSMISSION INTERVAL [$\mu$s] | PACKET TOTAL NUMBER |
|---|---|---|
| 1 | 30 | 3 |
| 2 | 20 | 3 |
| 3 | 30 | 3 |
| 4 | 20 | 3 |
| 5 | 30 | 3 |

FIG. 8

| TRANSMISSION INTERVAL [μs] | ID |
|---|---|
| 10 | |
| 20 | |
| 30 | 1 |
| 40 | |
| 50 | |

Fig. 9

| TRANSMISSION INTERVAL [$\mu$s] | ID |
|---|---|
| 10 | |
| 20 | 2, 4 |
| 30 | 1, 3 |
| 40 | |
| 50 | |

FIG. 10

| TRANSMISSION INTERVAL [$\mu$s] | ID |
|---|---|
| 10 | |
| 20 | |
| 30 | 1, 3, 5 |
| 40 | |
| 50 | |

FIG. 13

| TRANSMISSION INTERVAL [μs] | ID | REQUEST RECEPTION TIME |
|---|---|---|
| 10 | | |
| 20 | | |
| 30 | | |
| 40 | 7, 8 | yyyy/MM/DD 10:00:01.500 |
| 50 | 6 | yyyy/MM/DD 10:00:00.000 |

FIG. 14

| TRANSMISSION INTERVAL [μs] | ID | REQUEST RECEPTION TIME |
|---|---|---|
| 10 | | |
| 20 | | |
| 30 | 9(10), 10(10), 11(5), 12(5) | yyyy/MM/DD 10:00:01.500 |
| 40 | | |
| 50 | | |

FIG. 16

| TRANSMISSION INTERVAL [μs] | ID | REQUEST RECEPTION TIME |
|---|---|---|
| 10 | | |
| 20 | 13(10) | yyyy/MM/DD 10:00:02.000 |
| 30 | | |
| 40 | 14(5), 15(5) | yyyy/MM/DD 10:00:02.500 |
| 50 | | |

PACKET TRANSMISSION METHOD AND PACKET TRANSMITTING DEVICE

This application is a National Stage Entry of PCT/JP2016/002402 filed on May 17, 2016, which claims priority from Japanese Patent Application 2015-102571 filed on May 20, 2015, the contents of all of which are incorporated herein by reference, in their entirety.

TECHNICAL FIELD

The present invention relates to a packet transmission method and a packet transmitting device and, more particularly, to a packet transmission method and a packet transmitting device that are used for transmitting packet trains to a plurality of receiving devices.

BACKGROUND ART

As a method for measuring an available bandwidth in a network (hereinafter referred to as an "available bandwidth"), a technique described in PTL 1 has been known. In PTL 1, there is described a method for measuring the available bandwidth based on results of comparisons of transmission intervals and reception intervals for individual packets.

According to a technique described in PTL 1, a transmitting device transmits a measurement packet train composed of N measurement packets having packet numbers from 1 to N at an equal interval while increasing the size. Upon reception of each of the measurement packets, a receiving device calculates, for the each of these measurement packets, a transmission interval (the difference in a transmitted time at a transmitting side for the each measurement packet and an immediately previous measurement packet) and a reception interval (the difference in a received time at a receiving side for the each measurement packet and the immediately previous measurement packet), and obtains a minimum packet number j at which the reception interval becomes larger than the transmission interval. At this time, "size of a (j−1)th measurement packet"÷"transmission interval" is handled as a measurement value of the available bandwidth. Here, since the transmission interval for the measurement packets influences a measurement accuracy, it is important to set an appropriate value therefor. The above expression for obtaining such a measurement value for the available bandwidth shows that, when the size of each of the measurement packets 1 to N is fixed, a measurable available-bandwidth range is further increased as the transmission interval is set shorter, and is further decreased as the transmission interval is set longer.

In PTL 2, there is described a method that, when the scheduling of transmissions of VoIP (Voice over Internet Protocol) packets having mutually different transmission intervals is made at a radio base station, allows collisions of the packets to be prevented. The radio base station sets a scheduling cycle corresponding to the least common multiple of the transmission intervals of the respective VoIP packets. Further, the radio base station prevents the collisions of the packets by setting virtual slots within the scheduling cycle on a time-division basis and allocating the transmissions of the VoIP packets to the virtual slots.

CITATION LIST

Patent Literature

[PTL 1] Japanese Unexamined Patent Application Publication No. 2011-142622 (paragraphs [0050] to [0055])

[PTL 2] Japanese Unexamined Patent Application Publication No. 2005-252627 (paragraphs [0024] to [0039])

SUMMARY OF INVENTION

Technical Problem

In the configuration in PTL 1, let us consider a case where a measurement packet train is transmitted to each of a large number of receiving devices from one transmitting device. In this case, it is necessary for the transmitting device to transmit the measurement packet train to each of the plurality of receiving devices in parallel. Further, in the case where a connected network environment is different for each of the receiving devices, or the like, it is necessary to change a measurement range for each of the receiving devices. That is, it is necessary to transmit, in parallel, measurement packets having mutually different transmission intervals to the plurality of receiving devices. However, when the measurement packets are transmitted in such a way as to satisfy these necessities, the measurement packets, which are transmitted to the different receiving devices, may collide with each other.

In PTL 2, there is described a method for preventing the collisions of the packets. In the method described in PTL 2, however, there is a problem in that the measurement accuracy in the measurement of the available bandwidth is decreased. That is, in the method described in PTL 2, when a predetermined number of virtual slots are allocated within the scheduling cycle, the virtual slots are not set, or not selected, in such a way as to allow the transmission intervals of the packets to be kept constant. Thus, fluctuations occur in the transmission intervals of the packets, and the measurement accuracy is likely to be decreased.

(Object of Invention)

An object of the present invention is that a technique is provided that enables measurement packets to be efficiently transmitted to a plurality of receiving devices at constant transmission intervals.

Solution to Problem

A packet transmission method according to an aspect of the invention includes a procedure for grouping transmission requests each requesting transmission of one of packet trains each comprises a plurality of packets, each of the packets being transmitted every first time interval, into at least one group each associated with the first time interval, and for, based on the transmission request of the group whose number of the transmission request has reached a number larger than or equal to a predetermined value, transmitting the packet train corresponding to the transmission request.

A packet transmitting device according to the present invention includes transmission request processing means for receiving transmission requests each requesting a transmission of one of packet trains transmitted by a corresponding one of receiving devices, each of the packet trains comprising a plurality of packets each transmitted every first time interval; transmission scheduling means for grouping the transmission requests into at last one group each associated with the first time interval, and for, based on the transmission requests of the group whose number of the transmission request has reached a number larger than or equal to a predetermined value, instructing a transmission of the packet trains; and measurement packet transmitting means for transmitting the packet trains based on the instructing a transmission of the packet trains.

Advantageous Effects of Invention

The present invention brings an advantageous effect of being capable of transmitting measurement packets efficiently to a plurality of receiving devices at constant transmission intervals.

BRIEF DESCRIPTION OF DRAWINGS

FIG. 7 is a diagram illustrating a specific example of transmission requests.

FIG. 8 is a diagram illustrating a specific example of a transmission request list.

FIG. 9 is a diagram illustrating a specific example of the transmission request list.

FIG. 10 is a diagram illustrating a specific example of the transmission request list.

FIG. 13 is a diagram illustrating an example of a transmission request list after the completion of transmissions up to ID 5.

FIG. 14 is a diagram illustrating an example of the transmission request list after the completion of transmissions up to ID 8.

FIG. 16 is a diagram illustrating an example of the transmission request list after the completion of transmissions up to ID 12.

DESCRIPTION OF EMBODIMENTS

First Example Embodiment

Figure 1:
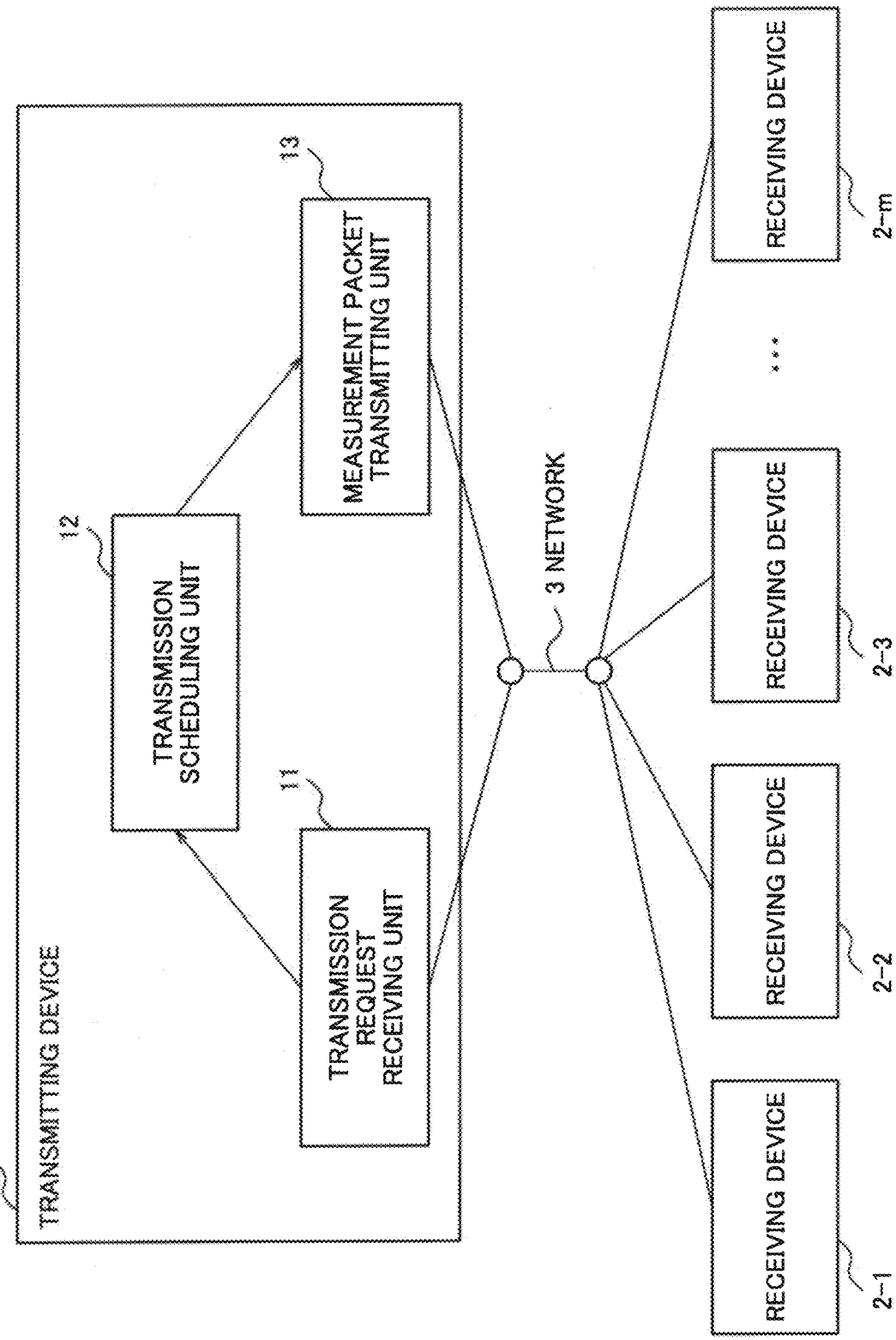
FIG. 1 is a block diagram illustrating a configuration of a bandwidth measurement system 100 according to a first example embodiment.

A first example embodiment of the present invention will be described in detail with reference to the drawings. FIG. 1 is a block diagram illustrating a configuration of a bandwidth measurement system 100 according to this first example embodiment. The bandwidth measurement system 100 includes a transmitting device 1, m receiving devices 2-1 to 2-m (m being a natural number), and a network 3. In the following, when the receiving devices 2-1 to 2-m are collectively referred to, these will be written as receiving devices 2. The transmitting device 1 and each of the receiving devices 2 are connected to each other via the network 3. The each receiving devices 2 transmits a measurement packet transmission request, and the transmitting device 1 receives the measurement packet transmission request via the network 3. The transmitting device 1 transmits measurement packet trains, and each of the receiving devices 2 receives a corresponding one of the measurement packet trains via the network 3. The measurement packet transmission request is a packet that each of the receiving devices 2 transmits in order to request the transmitting device 1 to transmit a measurement packet train. The measurement packet train is a series of packets for use in calculation by each of the receiving devices 2 with respect to an available bandwidth. In the following, "the measurement packet transmission request", which is transmitted by each of the receiving devices 2, may be written as just "a transmission request".

The transmitting device 1 includes a transmission request receiving unit 11, a transmission scheduling unit 12, and a measurement packet transmitting unit 13. The transmission request receiving unit 11 receives a transmission request having been transmitted by each of the receiving devices 2 (that is, the receiving devices 2-1 to 2-m). The transmission scheduling unit 12 determines the transmission time of a measurement packet train to be transmitted to each of the receiving devices 2. The measurement packet transmitting unit 13 transmits the measurement packet train to each of the receiving devices 2 based on an instruction by the transmission scheduling unit 12.

Figure 2:
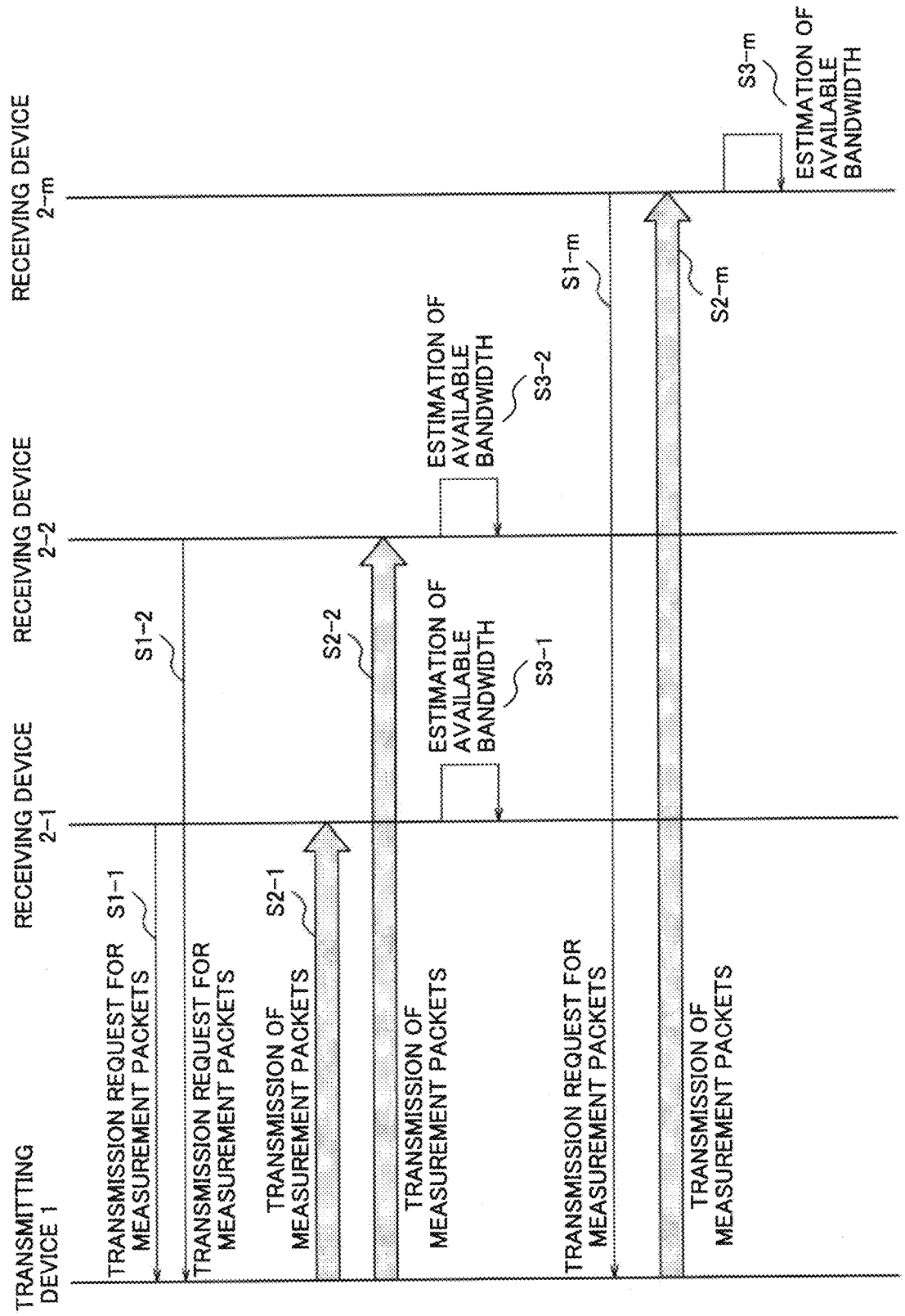
FIG. 2 is a sequence diagram illustrating an exemplary operation of the bandwidth measurement system 100.

FIG. 2 is a sequence diagram illustrating an exemplary operation of the bandwidth measurement system 100. The receiving devices 2 transmit transmission requests to the transmitting device 1 (steps S1-1, S1-2, . . . , and S1-m in FIG. 2). The transmitting device 1, having received the transmission requests, transmits measurement packet trains to the receiving devices 2, having transmitted the transmission requests, (steps S2-1, S2-2, . . . , and S2-m).

The measurement packet train is composed of one or more measurement packets, and each of the one or more measurement packets includes information indicating a transmitted time from the transmitting device 1. The measurement packets are each transmitted from the transmitting device 1 to each of the receiving devices 2 at a predetermined time interval. The transmission interval for the measurement packets may be different for each of the receiving devices 2. The each receiving devices 2 having received a measurement packet train calculates a measurement value for an available bandwidth based on the transmitted times and received times of received measurement packets.

Figure 3:
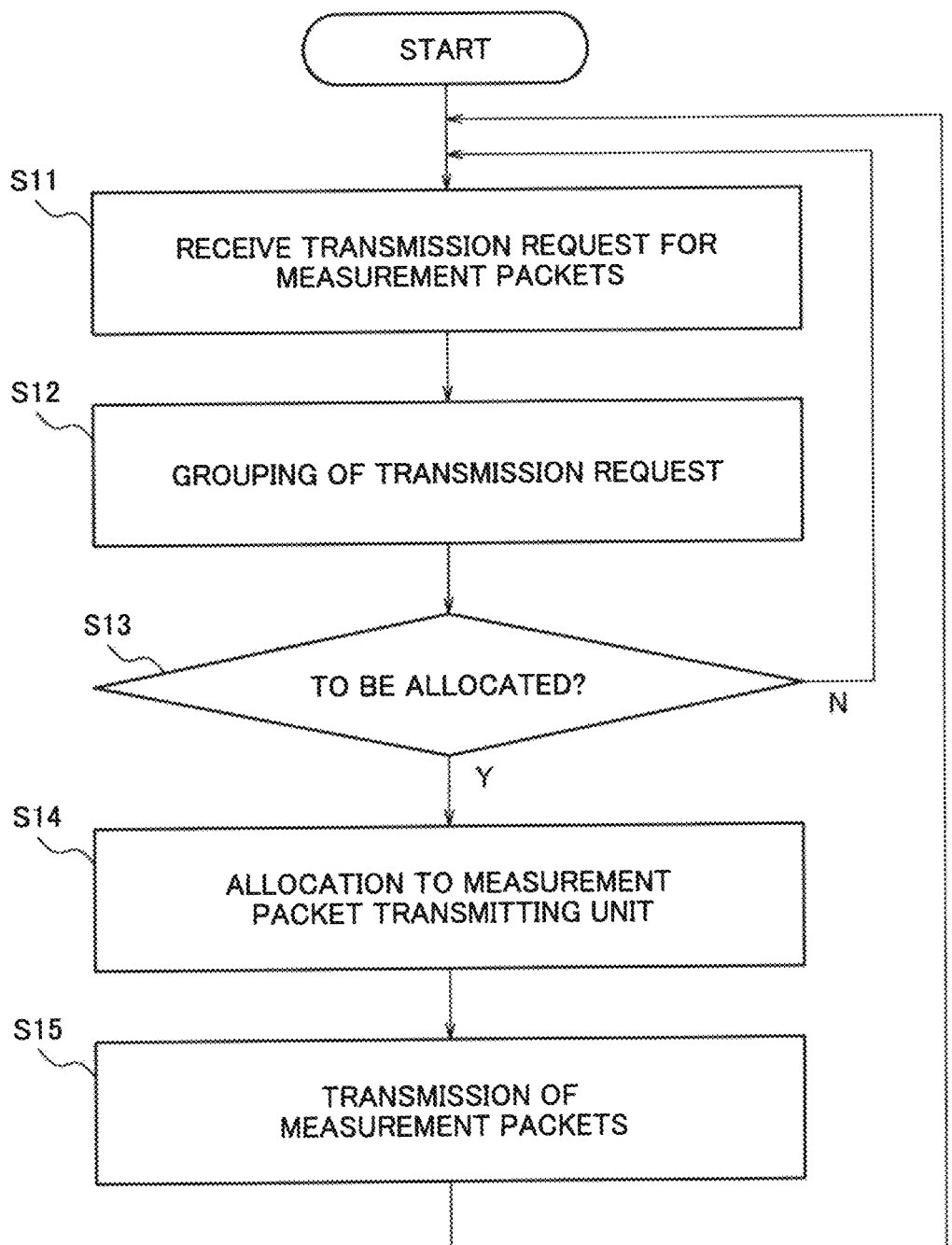
FIG. 3 is a flowchart illustrating an exemplary operation of a transmitting device 1.

FIG. 3 is a flowchart illustrating an exemplary operation of the transmitting device 1 in the present example embodiment. Upon reception of a transmission request from any one of the receiving devices 2, the transmission request receiving unit 11 of the transmitting device 1 transfers the received transmission request to the transmission scheduling unit 12 (step S11 of FIG. 3). Based on a transmission interval for measurement packets that is prescribed for the receiving devices 2 having transmitted the transmission request, the transmission scheduling unit 12 performs grouping of the received transmission request into a corresponding one of groups each associated with a corresponding one of transmission intervals for measurement packets (step S12). Next, the transmission scheduling unit 12 determines whether the transmission of a measurement packet train is to be allocated to the measurement packet transmitting unit 13 (step S13). When having determined that the measurement packet train is to be allocated (step S13: Y), the transmission scheduling unit 12 instructs the allocation of the measurement packet train, to the measurement packet transmitting unit 13 (step S14). Further, the measurement packet transmitting unit 13 transmits the measurement packet trains having been allocated, to the receiving devices 2 (step S15).

Next, a method for grouping a transmission request (step S12) and a method for determining the necessity/unnecessity of the allocation to the packet transmission unit 13 (step S13) in the transmission scheduling unit 12 will be described.

The transmission scheduling unit 12 sets in advance a minimum interval ts at which the measurement packet transmitting unit 13 transmits each of measurement packets. A span during this minimum interval ts will be referred to as "a slot", and one slot is supposed to be capable of transmitting up to one measurement packet. In such a way that a slot having the minimum interval ts is created and only up to one packet is transmitted to the receiving devices 2 through one slot, the fluctuation of a transmitted time of each measurement packet due to the influence of other packets can be prevented. When a transmission interval for a receiving device 2-$x$ ($x$-th receiving device) is denoted by tx, measurement packets for the receiving device 2-$x$ are transmitted at intervals of (tx/ts) slots.

Figure 4:
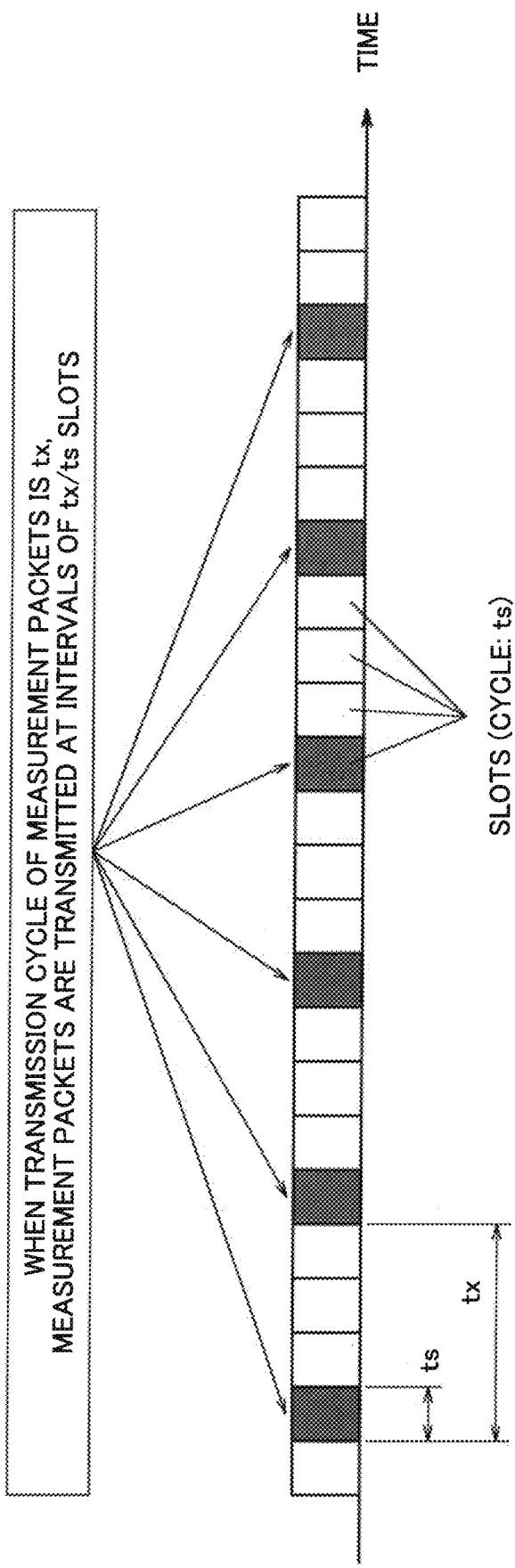
FIG. 4 is a diagram illustrating an example of the relation between a shortest transmission interval is for transmission slots and a transmission interval tx for measurement packets.

FIG. 4 is a diagram illustrating an example of the relation between the minimum transmission interval ts for transmission slots and the transmission interval tx for measurement packets to receiving devices. The transmission scheduling unit 12 performs grouping of each of received transmission requests each associated with a corresponding one of the transmission intervals tx, and generates a transmission request list. When a transmission request is received, an entry for the transmission request is added to the transmission request list. After the addition of the entry, when, for a group corresponding to a certain transmission interval tx, the number of one or more entries for one or more transmission requests has reached a number equal to tx/ts, the transmission scheduling unit 12 determines that the allocation condition in step S13 has been satisfied. Further, the transmission scheduling unit 12 consigns, in a lump, one or more entries of the relevant group to the measurement packet transmitting unit 13. The measurement packet transmitting unit 13 transmits measurement packets to each receiving device on a round-robin basis based on the one or more entries having been consigned by the transmission scheduling unit 12.

Figure 5:
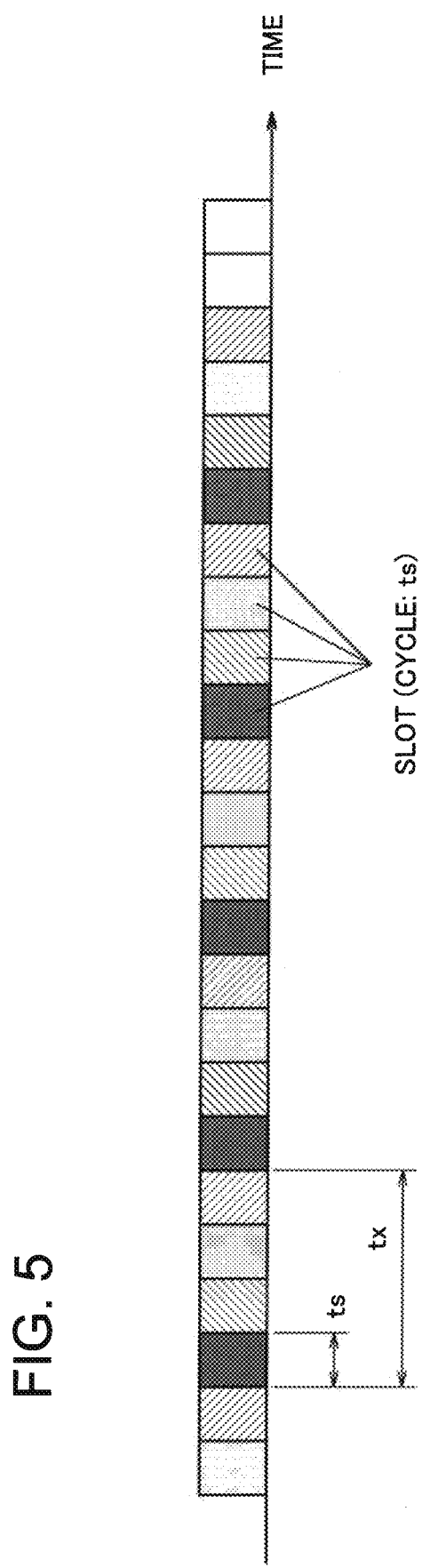
FIG. 5 is a diagram illustrating an example of the allocation of measurement packets to transmission slots.

FIG. 5 is a diagram illustrating an example of the allocation of measurement packets to transmission slots. In FIG. 5, slots having the same pattern represent transmission slots for a measurement packet train to the same one of the receiving devices 2. FIG. 5 illustrates an example in which tx/ts=4, and it is understood that no empty slot occurs in transmission slots in such a way that trains each composed of packets whose total number is equal to a number equal to tx/ts are allocated in a lump.

In such a way, the transmitting device 1 creates transmission slots each formed in a unit of the shortest transmission interval ts; performs grouping, for every one or more receiving devices 2 whose total number is equal to a number equal to tx/ts, with respect to measurement packets to the one or more receiving devices 2 for each of which a transmission interval for the measurement packets is tx; and performs the allocation of the measurement packets to the transmission slots. As a result, empty slots of the transmission slots are reduced, and a larger number of measurement packets can be transmitted to the receiving devices 2 during a measurement interval tx.

Modification Example of First Example Embodiment

In the aforementioned example embodiment, when, for a certain group corresponding to the transmission interval tx, the total number of entries for transmission requests has reached a number equal to tx/ts, the allocation to the measurement packet transmitting unit 13 is made. In the transmission scheduling unit 12, however, a next allocation may be made not only at the time of the reception of a transmission request for measurement packets (step S11), but also at the timing when the transmission of measurement packets having been allocated to the measurement packet transmitting unit 13 has been completed.

Figure 6:
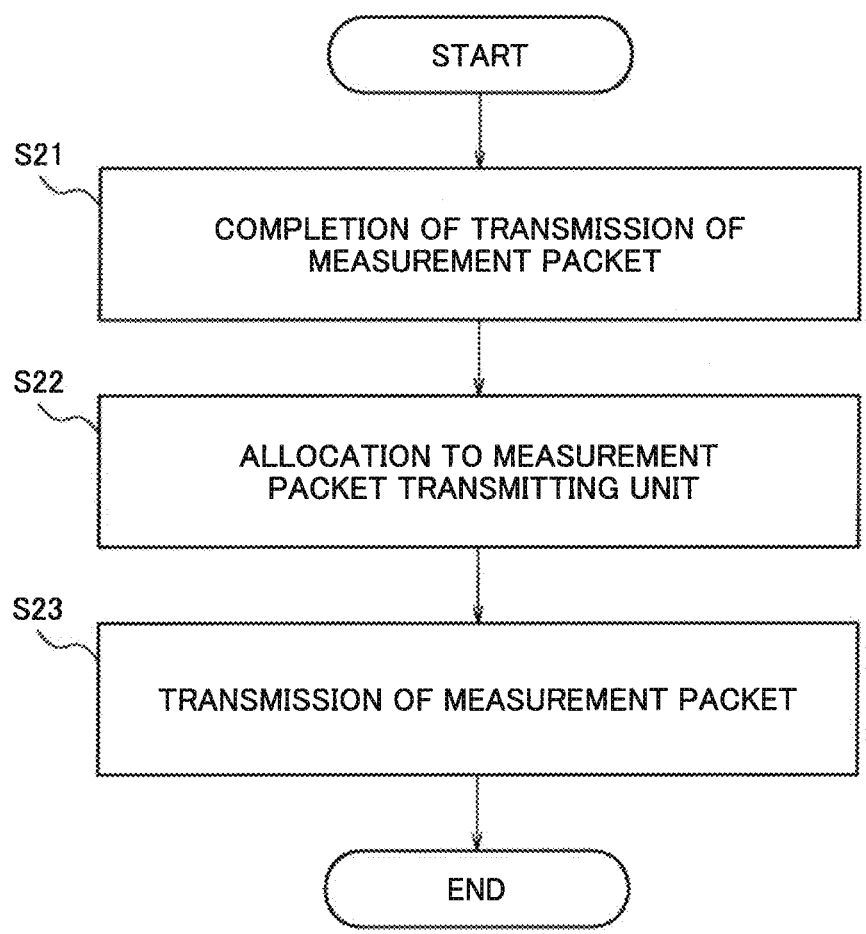
FIG. 6 is a flowchart illustrating an exemplary operation of a transmission scheduling unit 12 at the time of the completion of transmissions of measurement packets.

FIG. 6 is a flowchart illustrating an exemplary operation of the transmission scheduling unit 12 at the time of the completion of the transmission of measurement packets in this modification example of the first example embodiment. Upon completion of the transmission of all of measurement packets having been allocated to the measurement packet transmitting unit 13 (step S21), the transmission scheduling unit 12 retrieves, from the transmission request list, one or more entries for one or more not-yet-transmitted measurement packet trains included in a group corresponding to a transmission interval tx, and allocates the one or more entries to the measurement packet transmitting unit 13 (step S23). In this way, after the transmission of measurement packets of an already-allocated group, empty slots that occur during a period until the total number of transmission requests for measurement packets with respect to any of one or more not-yet-allocated groups reaches a number equal to tx/ts can be reduced, and thus, the number of transmitted measurement packets can be increased.

As described above, the bandwidth measurement system 100 and the transmitting device 1 in the first example embodiment and the modification example thereof are capable of transmitting measurement packets to individual receiving devices at constant transmission intervals, and additionally, are capable of transmitting a larger number of measurement packet trains to a large number of receiving devices during a unit time. This reason is because the measurement packet transmitting unit 13 sets time slots each having a predetermined interval ts, and the transmission scheduling unit 12 allocates measurement packet trains to the measurement packet transmitting unit 13 in such a way that allows the occurrence of empty slots to be reduced. That is, the bandwidth measurement system 100 and the transmitting device 1 in the first example embodiment and the modification example thereof bring about an advantageous effect of being capable of efficiently transmitting measurement packets to a plurality of receiving devices at constant transmission intervals. It should be noted that it is obvious that the advantageous effect that the measurement packets can be efficiently transmitted to a plurality of receiving devices at constant transmission intervals can be also obtained by the transmitting device 1 by itself.

Second Example Embodiment

In this second example embodiment, a specific exemplary configuration of the first example embodiment will be described. In this second example embodiment, the transmitting device 1 is a server device, and each of the receiving devices 2 is a terminal, such as a PC (Personal Computer), a smartphone, or a tablet. The network 3 is an IP (Internet Protocol) network constituted by a network for a data center where the transmitting device 1 is installed, the Internet, an access network provided by a communication carrier, and the like.

The functions of the transmission request receiving unit 11 and the measurement packet transmitting unit 13, which are included in the transmitting device 1, are implemented by the combination of a network interface mounted in the server device and programs executed on a CPU (Central Processing Unit). Further, the function of the transmission scheduling unit 12 is implemented by a program executed on the CPU of the server device. Moreover, in each of the receiving devices 2, a network interface is also mounted, and a program for transmitting a transmission request and receiving a measurement packet train to/from the transmitting device 1 as well as a program for measuring an available bandwidth using the measurement packet train is mounted.

In the present example embodiment, the shortest transmission interval is for measurement packets for the transmitting device 1 is supposed to be 10 [μs]. Accordingly, a measurement packet trains having a measurement interval tx [μs] is allocated to a measurement packet transmission unit every up to tx/10 measurement packet trains at the same time. For example, in the case where tx=100 [μs], up to 10 measurement packet trains are allocated, and in the case where tx=350 [μs], up to 35 measurement packet trains are allocated.

Figure 8:
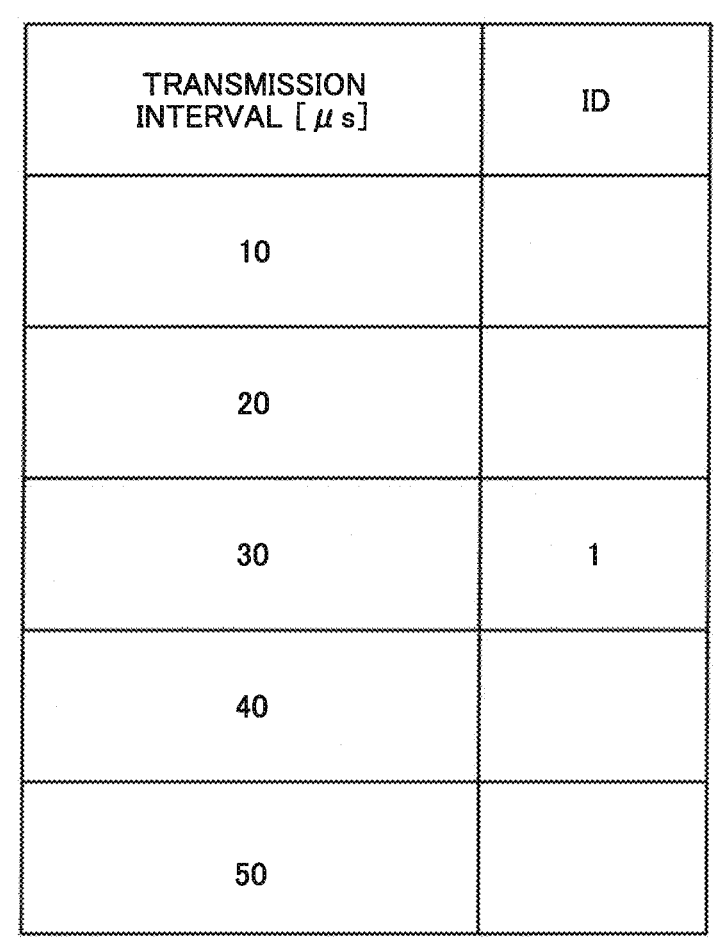

FIG. 7 illustrates a specific example of transmission requests having been received from receiving devices. A table of FIG. 7 shows a case where the transmitting device 1 has received five transmission requests having IDs (Identifiers) from 1 to 5. "ID" indicates individual transmission requests. "TRANSMISSION INTERVAL" indicates, for each field, a transmission interval tx. "PACKET TOTAL NUMBER" indicates, for each field, the number of measurement packets composing a corresponding measurement packet train. FIGS. 8 to 10 are diagrams illustrating specific examples of the transmission request list corresponding to the requests shown in FIG. 7. FIGS. 8 to 10 illustrates states in each of which one or more IDs for one or transmission requests are grouped for each transmission interval tx. Although, in FIGS. 8 to 10, only the case where the transmission interval tx takes values from 10 μs to 50 μs is illustrated, the range for the transmission interval tx is not limited to these values.

Upon reception of a transmission request having ID 1 that is a 1st transmission request, as shown in FIG. 8, the transmission scheduling unit 12 adds ID 1 to an "ID" field corresponding to 30 μs, that is, a transmission interval corresponding to ID 1. Similar processes are performed with respect to ID 2 and subsequent IDs, and at the time when a transmission request having ID 4 has been received, as shown in FIG. 9, the number of entries for a transmission request corresponding to 20 μs has reached two (that is, a number equal to tx/ts). At this time, the number of entries for a transmission request corresponding to 30 μs is also two, but has not yet reached a number equal to tx/ts. Thus, the transmission scheduling unit 12 allocates entries for ID 2 and ID 4 that are included in a group corresponding to the transmission request of 20 μs to the measurement packet transmitting unit 13.

Subsequently, at the time when a transmission request having ID 5 has been received, as shown in FIG. 10, the number of entries for a transmission request corresponding to 30 μs has reached a number equal to tx/ts (three). Thus, the transmission scheduling unit 12 allocates ID 1, ID 3, and ID 5 to the measurement packet transmitting unit 13.

Figure 11:
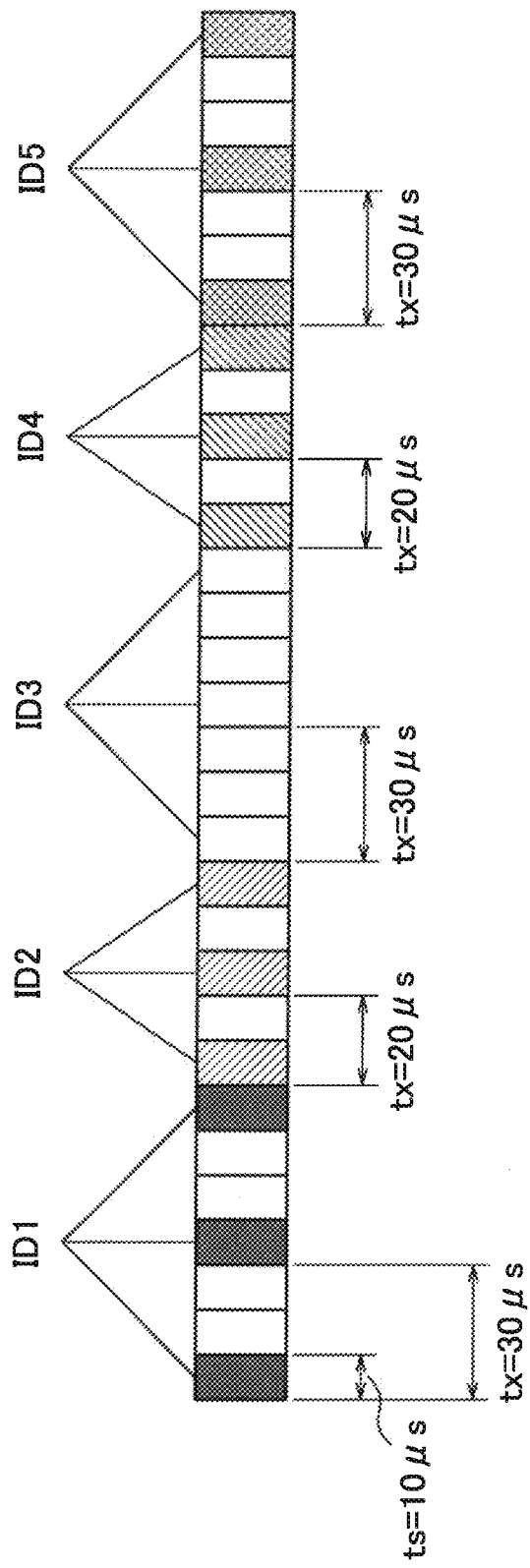
FIG. 11 is a diagram illustrating an example of the allocation of measurement packets to transmission packets.
Figure 12:
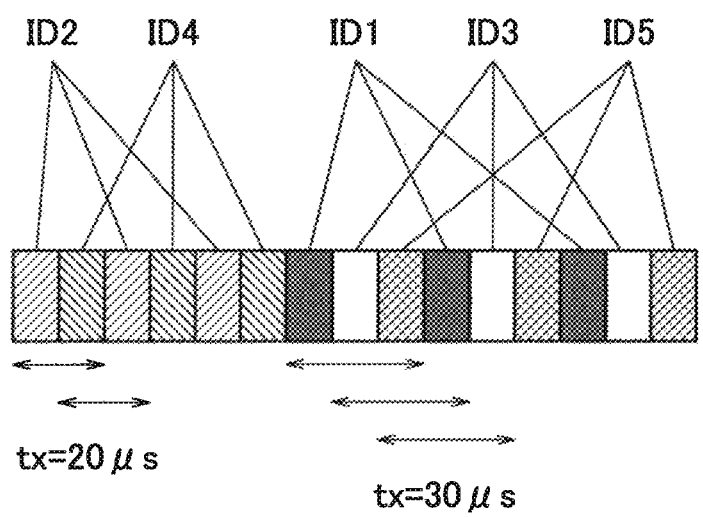
FIG. 12 is a diagram illustrating an example of the allocation of measurement packets to transmission packets.

FIGS. 11 and 12 are diagrams each illustrating an example of the allocation of measurement packets to transmission slots. FIG. 11 illustrates an example in which, upon reception of a transmission request, the allocation is made to the earliest allocable slots. For example, in the case of a measurement packet train corresponding to ID 2, when the allocation is made to slots from a 2nd slot to a 7th slot, collisions with a packet train corresponding to ID 1 occur, and thus, the allocation is made to an 8th slot after the completion of the transmission of the packet train corresponding to ID 1. FIG. 12 illustrates an example of an allocation to individual slots in accordance with the procedure of the present example embodiment, and measurement packets for IDs corresponding to an equal transmission interval tx are successively allocated onto transmission slots. In each of FIG. 11 and FIG. 12, a transmission interval tx for measurement packets corresponding to each of ID 2 and ID 4 is 20 μs, and a transmission interval tx for measurement packets corresponding to each of ID 1, ID 3, and ID 5 is 30 μs.

In FIG. 11, 31 slots are needed to transmit measurement packet trains corresponding to five transmission requests having ID 1 to ID 5. On the contrary, in FIG. 12, measurement packets are allocated for each group of entries corresponding to an equal transmission interval tx, and thus, needed slots are just 15 slots. That is, according to the procedure of the present example embodiment, the number of slots needed for the transmission of measurement packet trains can be reduced to a number smaller than or equal to half the number of needed slots in FIG. 11. Accordingly, according to the allocation procedure of the present embodiment, a larger number of measurement packets can be transmitted during a unit time.

Next, a procedure after the completion of the transmission of the measurement packets corresponding to ID 1 to ID 5 will be described. Upon completion of the transmission of measurement packet trains, the transmission scheduling unit 12 of the transmitting device 1 determines measurement packet trains to be transmitted next by referring to the transmission request list. FIG. 13 is a diagram illustrating an example of the transmission request list after the completion of the transmission of the measurement packets corresponding to ID 1 to ID 5. Since transmission requests up to ID 5 are already processed, these are deleted from the transmission request list, and only ID 6 to ID 8 that is not-yet-processed transmission requests, are written on the list. A field corresponding to "REQUEST RECEIVED TIME" in the list represents a reception time of a transmission request having been received first in a group associated with a transmission interval tx corresponding to the field, and upon completion of the allocation to the measurement packet transmitting unit 13, this field is reset.

At the time of the completion of the transmission of one or more measurement packet train, even in the case where the number of one or more entries included in each of transmission-interval associated groups remained in the transmission request list has not yet reached a number equal to tx/ts, one or more measurement packet trains may be allocated. At this time, a procedure for determining from which of the transmission-interval associated groups the one or more transmission requests are to be allocated is optional. Examples of such a procedure include, but are not limited to, a procedure for selecting a group including the largest number of transmission requests, a procedure for selecting a group for which a value obtained by "tx/ts—the number of one or more transmission requests" is smallest, and a procedure for selecting a group for which the reception time of the first transmission request is oldest.

In such a way that, at the time of the completion of the transmission of one or more measurement packet trains, the allocation to the measurement packet transmitting unit 13 is made even in the case where there is not any transmission-interval associated group including one or more transmission requests whose number has reached a number equal to tx/ts, it is possible to reduce a situation where the measurement packet transmitting unit 13 enters an idle state and empty slots occur. As a result, with such an allocation described above, it is possible to transmit a larger number of measurement packet trains.

When a predetermined period of time has passed from the reception time of the first transmission request, even though the number of entries does not satisfy the allocation condition, for a relevant group, the transmission scheduling unit 12 may allocate one or more transmission requests to the measurement packet transmitting unit 13. With this configuration, it is possible to shorten a waiting time from the time when one of the receiving devices 2 has made a request for the transmission of measurement packets until the measurement packets are actually transmitted.

Modification Example of Second Example Embodiment

In the aforementioned second example embodiment, even though IDs are mutually different, the number of measurement packets included in each measurement packet train is constant (three in the example shown in FIG. 3). In this modification example of the second example embodiment, a case where the packet transmission scheduling unit 12 processes transmission requests for which measurement packet trains including mutually different numbers of measurement packets are mixed will be described.

Figure 15:
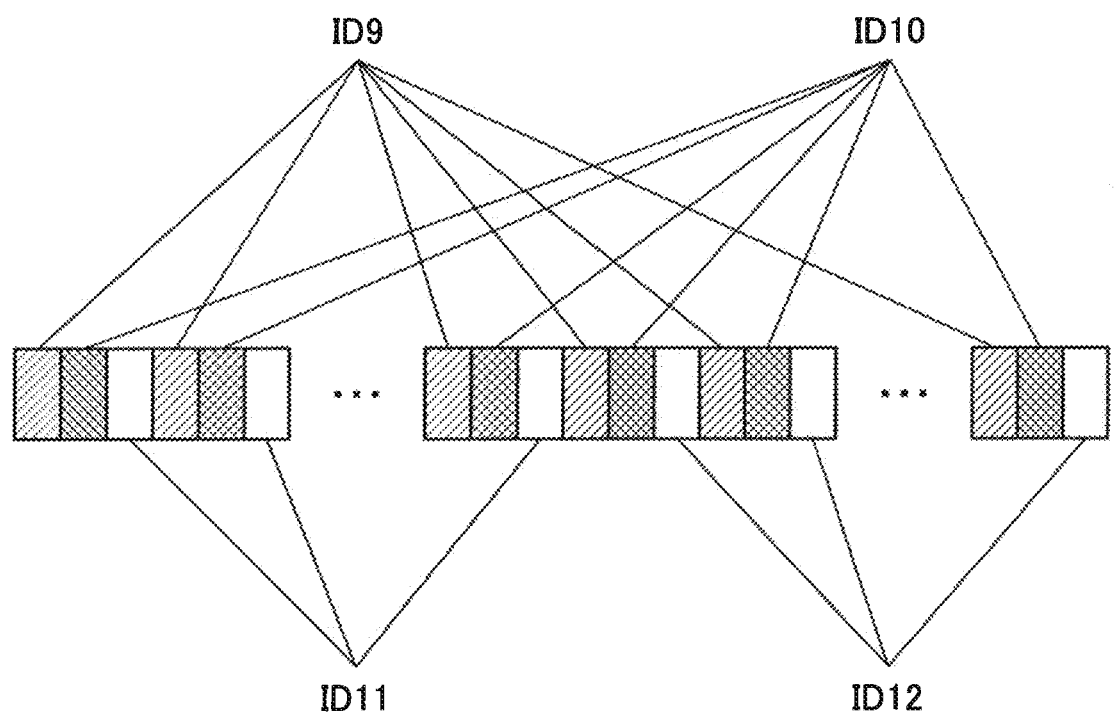
FIG. 15 is a diagram illustrating an example of the allocation of measurement packets in the case where measurement packet trains composed of mutually different numbers of packets are mixed and transmitted.

A value written with parentheses in an ID field of FIG. 14 is the number of packets of a measurement packet train to be transmitted in response to a transmission request having a relevant ID. With respect to the number of packets composing a measurement packet train, a relevant one of the receiving devices 2 may designate it using a packet of a transmission request, or the transmitting device 1 may retain a predetermined value for each of the receiving devices 2. FIG. 14 shows that a measurement packet corresponding to each of ID 9 and ID 10 is composed of ten packets, and a measurement packet corresponding to each of ID 11 and ID 12 is composed of five packets. FIG. 15 is a diagram illustrating an example of the allocation of measurement packets in the case where measurement packet trains composed of mutually different numbers of packets are mixed and transmitted. As shown in FIG. 15, when transmission requests for which the numbers of packets composing measurement packet trains are mutually different are mixed, a not-yet-transmitted packet train is transmitted using time slots being used by an already-transmitted packet train. Specifically, first, measurement packets corresponding to ID 11 are transmitted following measurement packets corresponding to ID 9 and ID 10. Further, after the completion of the transmission of the measurement packets corresponding to ID 11, measurement packets corresponding to ID 12 are transmitted using time slots having been used by the measurement packets corresponding to ID 11. Through such an allocation as well, it is possible to reduce the number of empty slots and transmit a larger number of measurement packets during a unit time.

Figure 17:
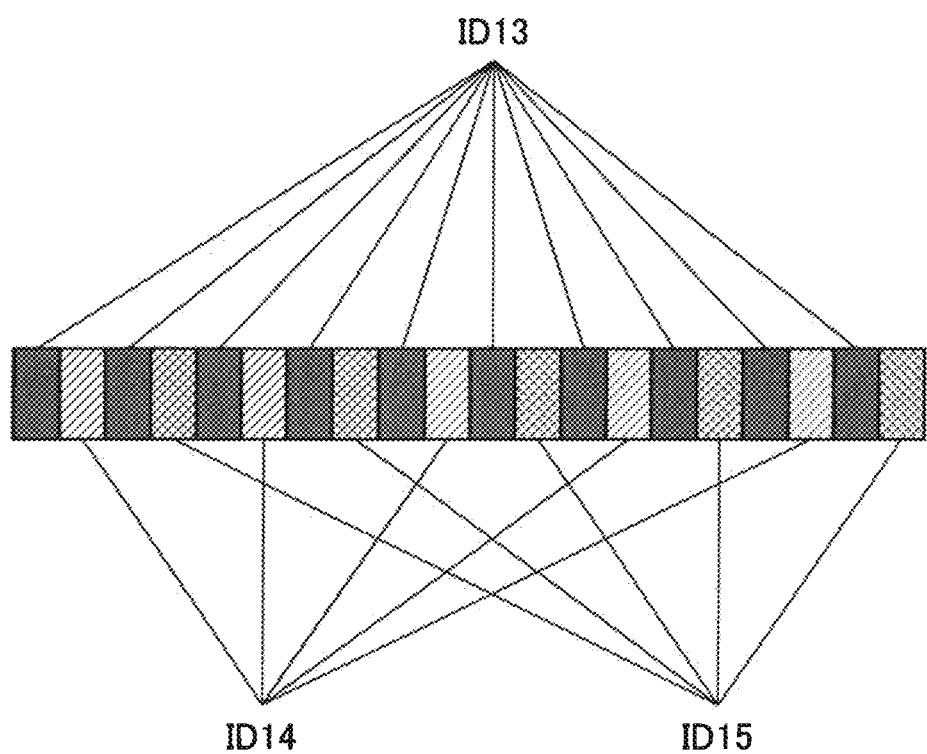
FIG. 17 is a diagram illustrating an example of a case where packet trains having mutually different transmission intervals are allocated at the same time.

The measurement packet trains composed of mutually different numbers of packets may be allocated in such a way as to be further combined with packet trains having mutually different packet-transmission intervals. FIG. 16 is a diagram illustrating an example of a transmission request list after the completion of transmissions to up to ID 12. FIG. 17 is a diagram illustrating an example of a case where packet trains having mutually different transmission intervals are allocated at the same time.

FIG. 16 illustrates an example of a transmission request list in the case where there are one transmission request (ID 13) for a measurement packet train having a transmission interval of 20 [μs] and two transmission requests (ID 14 and ID 15) for a measurement packet train having a transmission interval of 40 [μs]. As shown in FIG. 17, each of measurement packets corresponding to the transmission interval of 20 [μs] and each of measurement packets corresponding to the transmission interval of 40 [μs], which is two times the transmission interval of 20 [μs], are allocated successively to each other on transmission slots. Through such an allocation of measurement packets as shown in FIG. 17 as well, it is possible to decrease the number of empty slots and transmit a larger number of measurement packets during a unit time. In the case where the combination of packet trains having mutually different transmission intervals is made, the advantageous effect of decreasing the number of empty slots is increased by combining a measurement packet train having a minimum transmission interval (ID 13 in FIG. 16) with measurement packet trains each having a transmission interval that is an integral multiple of the minimum transmission interval (ID 14 and ID 15 in FIG. 16).

As described above, in the second example embodiment and the modification example thereof as well, the bandwidth measurement system 100 and the transmitting device 1 bring about an advantageous effect of being capable of efficiently transmitting measurement packets to a plurality of receiving devices at constant transmission intervals.

Third Example Embodiment

The transmitting device 1 according to this third example embodiment includes a configuration similar to those of the first and second example embodiments except that it is different from the first and second example embodiments that the measurement packet transmitting unit 13 is separated into a plurality of units. Since the shorter the minimum transmission interval ts for measurement packets is set, the further the number of slots (the number of transmittable packets) per unit time is increased, it is desirable that the ts is short. However, when the minimum transmission interval ts is set short, the processing capability of a CPU is likely to be tight. Thus, in such a way that a plurality of CPUs (or CPU cores) are used and each of the CPUs (or the CPU cores) is allowed to transmit measurement packets while shifting the timing of the transmission, it is possible to transmit a larger number of measurement packets.

Figure 18:
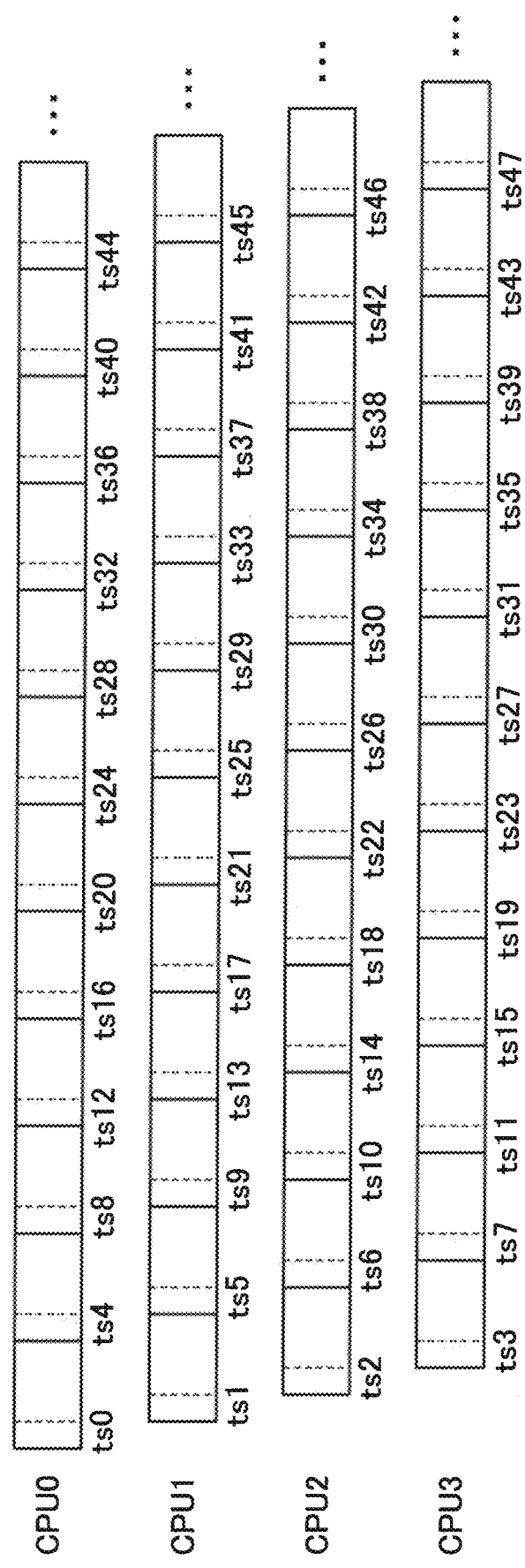
FIG. 18 is a diagram illustrating an example in which measurement packets are transmitted using four CPUs (or cores).

FIG. 18 illustrates an example in which measurement packets are transmitted using four CPUs (or cores). The number of CPU may be arbitrary determined and is not limited to four. Each of the CPUs transmits measurement packets at intervals of a time equal to "ts×the number of the CPUs". The number of the CPUs is four in the example of FIG. 18. In such a way that each CPU shifts the timing of the transmission of each measurement packet by ts, the fluctuation in the transmission interval due to the collision of packet transmission timings is prevented.

It is obvious that, just like in the first and second example embodiments, the bandwidth measurement system 100 and the transmitting device 1 also bring about the advantageous effect of being capable of efficiently transmitting measurement packets to a plurality of receiving devices at constant transmission intervals. Moreover, the bandwidth measurement system 100 and the transmitting device 1 according to this third example embodiment are capable of shortening the measurement packet transmission interval ts and transmitting a larger number of measurement packets during a unit time by executing the transmission using a plurality of CPUs.

The minimum transmission interval ts for measurement packets is determined based on the number of one or more used network interfaces, the speed of each of the used one or more network interfaces, and a maximum size for the measurement packets. For example, in the case where one network interface of 10 Gbps (Gigabit per second) is used and the maximum size for the measurement packets is 1500 bytes, when one byte is supposed to be 8 bits, a time needed to transmit the 1500 bytes is: 1500 [bytes]×8 [bits/byte]/10,000,000,000 [bps]=0.0000012 [s] (1.2 µs).

Here, when ts is supposed to be 1.25 µs, 800,000 packets can be transmitted during one second. Note that 1500 bytes correspond to the maximum value of the packet sizes of transmittable packets in Ethernet (registered trademark).

In the case where a plurality of the measurement packet transmitting units 13 are used, when one or more transmission request entries of a certain group have satisfied the allocation condition (in the case of Yes in step S13), the transmission scheduling unit 12 may allocate the measurement packets to a measurement packet transmitting unit 13 for which the transmission has been completed earliest. In this way, it is possible to reduce a delay until the transmission of measurement packets.

Although the present invention has been described with reference to the example embodiments above, the present invention is not limited to the aforementioned example embodiments. Various changes understandable by those skilled in the art can be made on the configuration and the details of the present invention within the scope of the present invention. Further, the numeric values used in the description of the example embodiments are just examples, and do not limit the content of the present invention to only the numerical values of the example embodiments.

In each individual example embodiment, the functions and the operation procedures of each unit of the transmitting device 1 may be implemented by allowing a central processing unit (CPU) to execute programs. The programs are recorded in a fixed and non-transitory recording medium. The CPU and the recording medium are a computer and a memory included inside the transmitting device 1. The recording medium is implemented using a semiconductor memory or a hard disk drive, but is not limited to these.

The individual example embodiments of the present invention can be also written as the following supplementary notes, but are not limited to these.

(Supplementary Note 1)

A packet transmission method comprising:

grouping transmission requests each requesting a transmission of one of packet trains each comprises a plurality of packets, each of the packets being transmitted every first time interval, into at least one group each associated with the first time interval; and based on the transmission request of the group whose number of the transmission request has reached a number larger than or equal to a predetermined value, transmitting the packet trains corresponding to the transmission request.

(Supplementary Note 2)

The packet transmission method according to supplementary note 1, wherein the packets comprised in the packet trains are allocated on time slots each having a second time interval smaller than the first time interval, and up to one packet among the packets is stored in each of the time slots.

(Supplementary Note 3)

The packet transmission method according to supplementary note 2, wherein the predetermined value is a value obtained by dividing the first time interval by the second time interval.

(Supplementary Note 4)

The packet transmission method according to supplementary note 2 or 3, wherein, when the transmission requests for which the numbers of the packets comprised in the packet trains are mutually different are mixed, a not-yet-transmitted packet train among the packet trains is transmitted using time slots used by an already-transmitted packet train among the packet trains.

(Supplementary Note 5)

The packet transmission method according to any one of supplementary notes 2 to 4, wherein each of packets comprised in a first packet train among the packet trains and each of packets comprised in a second packet train among the packet trains having the first time interval, the first time interval of the second packet train being equal to an integral multiple of the first time interval of the first packet train, are transmitted successively to each other on time slots among the time slots.

(Supplementary Note 6)

The packet transmission method according to any one of supplementary notes 1 to 5, wherein, after the packet trains has been transmitted, based on the transmission request of the group whose number does not yet reach the predetermined value, the packet trains corresponding to the transmission request is transmitted.

(Supplementary Note 7)

The packet transmission method according to any one of supplementary notes 1 to 6, wherein based on the transmission request of the group that a predetermined period of time has passed after grouping of the first transmission request, the packet trains corresponding to the transmission request is transmitted.

(Supplementary Note 8)

The packet transmission method according to any one of supplementary notes 1 to 7, wherein through a plurality of transmitting means, the packet trains are transmitted at mutually different timings each associated with each of the transmitting means.

(Supplementary Note 9)

A packet transmitting device comprising:

transmission request processing means for receiving transmission requests each requesting a transmission of one of packet trains transmitted by a corresponding one of receiving devices, each of the packet trains comprising a plurality of packets each transmitted every first time interval;

transmission scheduling means for grouping the transmission requests into at last one group each associated with the first time interval, and for, based on the transmission request of the group whose number of the transmission request has reached a number larger than or equal to a predetermined value, instructing a transmission of the packet trains; and measurement packet transmitting means for transmitting the packet trains based on the instructing a transmission of the packet trains.

(Supplementary Note 10)

A bandwidth measurement system comprising:

receiving devices each for transmitting a transmission request of one of packet trains, each packet trains comprising a plurality of packets and each packets being transmitted at a first time interval;

the packet transmitting device according to claim 9 which receives the transmission request and transmits the packet trains to the receiving devices based on the transmission request; and a network for interconnecting the receiving device and the transmitting device.

(Supplementary Note 11)

The bandwidth measurement system according to supplementary note 10, wherein each of the receiving devices calculates an available bandwidth between the each of the receiving devices and the transmitting device based on transmitted times and received times of the packets comprised in the packet train.

(Supplementary Note 12)

A packet transmission program for allowing a computer of a packet transmitting device to execute procedures comprising:

a procedure for sorting transmission requests each requesting a transmission of packet trains each includes a plurality of packets each transmitted every first time interval into a group every value of the first time interval; and a procedure for, based on the transmission requests of the group whose number of the transmission requests being sorted has reached a number larger than or equal to a predetermined value, transmitting the packet train every first time interval.

This application is based upon and claims the benefit of priority from Japanese Patent Application No. 2015-102571, filed on May 20, 2015, the disclosure of which is incorporated herein in its entirety by reference.

INDUSTRIAL APPLICABILITY

The transmitting device of each of the example embodiments is applicable to not only a server device for measuring available bandwidths, but also a scheduler of a base station device, and the like.

REFERENCE SIGNS LIST

100: bandwidth measurement system
1: transmitting device
2 (2-1 to 2-$m$): receiving devices
3: network
11: transmission request receiving unit
12: transmission scheduling unit
13: measurement packet transmitting unit

What is claimed is:

1. A method comprising:
receiving, by a transmitting device, a plurality of requests from a plurality of receiving devices, each request requesting transmission of a packet train of a plurality of packets at a requested transmission interval;
grouping, by the transmitting device, the requests into groups in correspondence with the requested transmission intervals of the requests, such that the requests of each group have an identical requested transmission interval;
for each group of the requests, determining, by the transmitting device, whether a number of the requests in the group is greater than a threshold; and
for each group of requests in which the number of requests is greater than the threshold, transmitting, by the transmitting device to each receiving device from which one of the requests of the group was received, the packets of the packet train in a parallel unicast manner at the identical requested transmission interval of the group.

2. The method of claim 1, wherein each receiving device determines the requested transmission interval of the request that the receiving device transmits to the transmitting device based on an available bandwidth that the receiving device calculates based on transmission times and receipt times of the packets of the packet train.

3. The method of claim 1, wherein for each group of requests in which the number of requests is not greater than the threshold, the transmitting device does not transmit, to any receiving device from which one of the requests of the group was received, the packets of the packet train.

4. A non-transitory computer-readable data storage medium storing program code executable by a transmitting to perform processing comprising:
receiving a plurality of requests from a plurality of receiving devices, each request requesting transmission of a packet train of a plurality of packets at a requested transmission interval;
grouping the requests into groups in correspondence with the requested transmission intervals of the requests, such that the requests of each group have an identical requested transmission interval;
for each group of the requests, determining whether a number of the requests in the group is greater than a threshold; and
for each group of requests in which the number of requests is greater than the threshold, transmitting, to each receiving device from which one of the requests of the group was received, the packets of the packet train in a parallel unicast manner at the identical requested transmission interval of the group.

5. The non-transitory computer-readable data storage medium of claim 4, wherein each receiving device determines the requested transmission interval of the request that the receiving device transmits to the transmitting device based on an available bandwidth that the receiving device calculates based on transmission times and receipt times of the packets of the packet train.

6. The non-transitory computer-readable data storage medium of claim 4, wherein for each group of requests in which the number of requests is not greater than the threshold, the transmitting device does not transmit, to any receiving device from which one of the requests of the group was received, the packets of the packet train.

7. A packet transmitting device comprising:
a processor;
a memory storing instructions executable by the processor to perform processing comprising:
receiving a plurality of requests from a plurality of receiving devices, each request requesting transmission of a packet train of a plurality of packets at a requested transmission interval;
grouping the requests into groups in correspondence with the requested transmission intervals of the requests, such that the requests of each group have an identical requested transmission interval;
for each group of the requests, determining whether a number of the requests in the group is greater than a threshold; and
for each group of requests in which the number of requests is greater than the threshold, transmitting, to each receiving device from which one of the requests of the group was received, the packets of the packet train in a parallel unicast manner at the identical requested transmission interval of the group.

8. The packet transmitting device of claim 7, wherein each receiving device determines the requested transmission interval of the request that the receiving device transmits to the transmitting device based on an available bandwidth that the receiving device calculates based on transmission times and receipt times of the packets of the packet train.

9. The packet transmitting device of claim 7, wherein for each group of requests in which the number of requests is not greater than the threshold, the transmitting device does not transmit, to any receiving device from which one of the requests of the group was received, the packets of the packet train.

10. A system comprising:
a plurality of receiving devices; and
a transmitting device communicatively connected to the receiving devices and to perform processing comprising:
receiving a plurality of requests from the receiving devices, each request requesting transmission of a packet train of a plurality of packets at a requested transmission rate;
grouping the requests into groups in correspondence with the requested transmission intervals of the requests, such that the requests of each group have an identical requested transmission interval;
for each group of the requests, determining whether a number of the requests in the group is greater than a threshold; and
for each group of requests in which the number of requests is greater than the threshold, transmitting, to each receiving device from which one of the requests of the group was received, the packets of the packet train in a parallel unicast manner at the identical requested transmission interval of the group.

11. The system of claim 10, wherein each receiving device determines the requested transmission interval of the request that the receiving device transmits to the transmitting device based on an available bandwidth that the receiving device calculates based on transmission times and receipt times of the packets of the packet train.

12. The system of claim 10, wherein for each group of requests in which the number of requests is not greater than the threshold, the transmitting device does not transmit, to any receiving device from which one of the requests of the group was received, the packets of the packet train.

* * * * *